Oct. 26, 1971   R. PERRIER   3,614,958

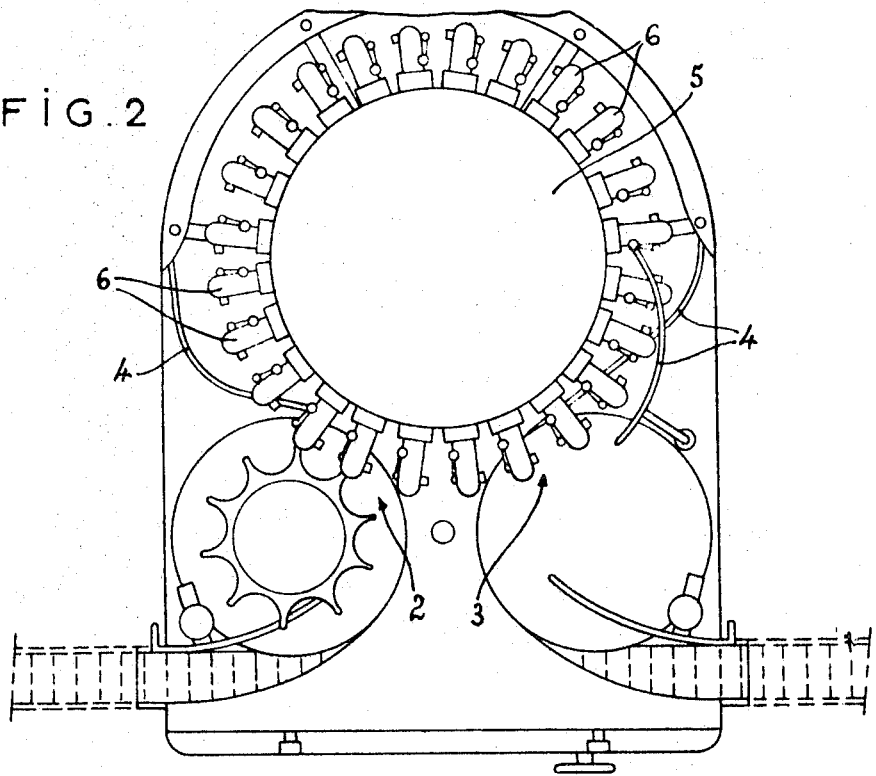
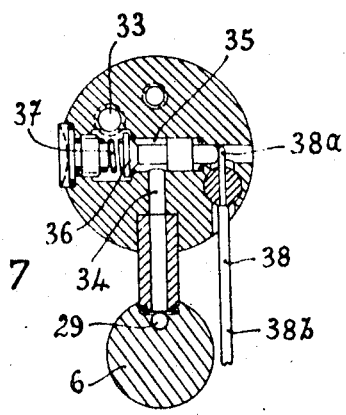

MACHINES INTENDED FOR TURNING BOTTLES, FLASKS OR THE LIKE

Filed Jan. 15, 1969   4 Sheets-Sheet 3

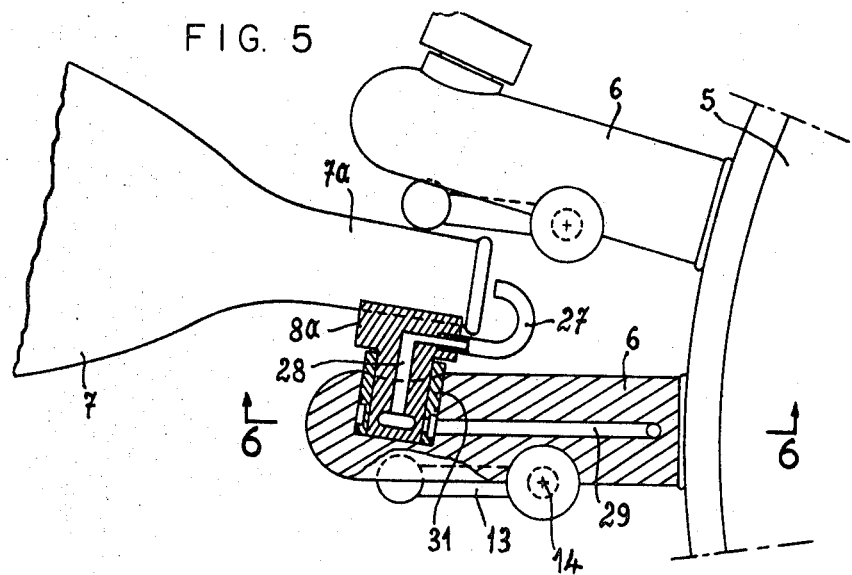
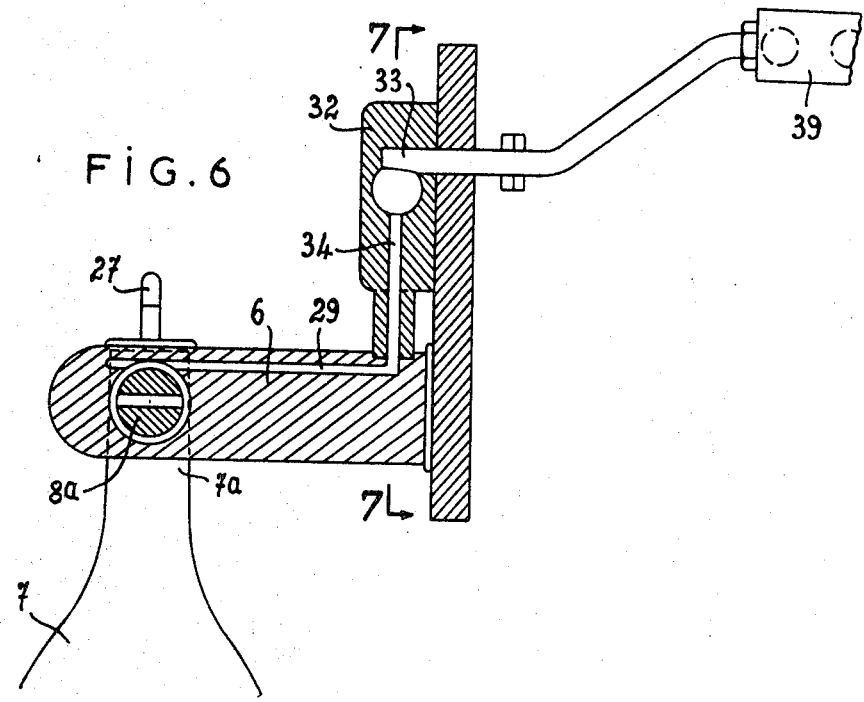

United States Patent Office 3,614,958
Patented Oct. 26, 1971

3,614,958
MACHINES INTENDED FOR TURNING BOTTLES, FLASKS OR THE LIKE
Rene Perrier, Le Cheylard, Ardeche, France
Filed Jan. 15, 1969, Ser. No. 791,247
Claims priority, application France, Feb. 9, 1968, 49,631
Int. Cl. B08b 3/00
U.S. Cl. 134—48
12 Claims

ABSTRACT OF THE DISCLOSURE

A machine for turning bottles has a rotating drum with fixed radial arms between which the bottles are seized one by one at an input zone and borne to an output zone. Each bottle is sequentially turned partly or fully upside down during the transit. Each arm bears a pair of pads; one is rotatable around a horizontal axis and has a concave face corresponding to the curvature of the bottle neck and accompanying the bottle as it turns; the other is borne on a radially outer end of a bent finger hinged at its angle to the arm so as to be angularly displaceable. The shank of the finger projects into an axial cylindrical cavity of the arm and is actuated by a push rod sliding in this cavity against a return spring. The push rod, cushioned by an intermediate spring, is actuated through a further rod driven by a cam on the drum, so as to grip a bottle between the pads. The turn pad is equipped with a nozzle for injecting washing liquid, into the bottle neck automatically at selected positions and is supplied through a chanel and turncock provided in the turn pad and arm. A valve cock governed by cams driven by the drum controls the supply to each arm and a turning joint in the axle of the drum is associated with a liquid distributor having an outlet to each arm.

The present invention relates to machines intended for turning bottles, flasks or the like. More particularly it relates to machines for turning bottles, flasks or the like by taking them from the input side, one by one, and by their body between two hands or pads along two opposite generators at 180°, these pads being hinged around horiontal axes situated in the extension of one another so as to be able to turn on themselves in accompanying the turning movement of the bottles at the same time as they are endowed with a movement of translation from the input to the output and during this course, the bottles are subjected to a total or partial turning.

Moreover, the pads are distributed in pairs and as a star on the periphery of a drum-actuated by a continuous rotary movement one of the arms of each pair being fixed on this drum, whilst the other is hinged on it.

In this type of machine, such as that according to U.S. Pat. No. 3,208,579 the act of seizing the bottles by their body obliges the latter to be spaced from one another to enable the introduction, between them, of the fixed arm of one pair and of the movable arm of the neighboring pair. As a result, for a machine of which the tray is of a given diameter, the number of bottles simultaneously under treatment is less than if they were in juxtaposition. On the other hand, the act of taking the bottles by their body only enables the treatment of those bottles, whose body is cylindrical, which therefore eliminates bottles of, for example, tronconic or ovoid shape.

It is an object of the present invention to remedy this drawback by enabling the gripping of the bottles by their neck.

Other objects and advantages will emerge from the description which follows.

The invention relates therefore to an improvement in machines of the aforesaid type, according to which improvement a single arm, fixed with respect to the tray or drum which drives it, bears situated respectively on its two opposite sides, one of two pads of two neighboring pairs of pads, one at least of these pads being capable of turning around a horizontal axis to accompany the bottle on its turning and being of semi-circular section corresponding to the external diameter of a bottle neck, while the other of these pads is borne by a bent finger hinged around an axis for displacement, under the action of mechanical, hydraulic, pneumatic or other means, by the shank of the said finger and application against the neck of the bottle by pushing this latter against the fixed, although turning, pad of the neighboring arm.

In the case of a mechanical actuation of the aforesaid bent finger, this actuation is advantageously effected by a cam and a push member. The action of gripping is thus irreversible so that the neck of the bottle is as if locked between two gripping pads from the input to the output of the machine.

Preferably, the gripping action is exerted flexibibly by the interposition of compensating springs in the transmission.

According to another feature of the invention, the taking of the bottles by their neck permits advantage to be taken of the support of the fixed but turning semi-circular pad, by making it comprise a nozzle which, being automatically located opposite the opening of the neck of the bottle, enables, in the case of empty bottles, the injection into their interior of a gaseous or liquid treatment fluid, when the bottle is in turned position or when it starts its return movement.

This turn pad, bearing its nozzle, is, moreover, utilized to constitute a turncock intended to permit the injection only at the selected moment, on turning.

Preferably, another control tap by a cam is interposed in the distribution circuit of the fluid to regulate the time of injection.

Naturally it is possible to give to the bottles any desired amount of turn such as a partial turn, a complete turn, several turns, etc.

It is also possible, with only a partial turn, that is to say with the bottle slightly recumbent, to obtain filling of the latter at the same time as its empting in the case of gaseous liquids, such as champagne wines.

The general supply of the treatment fluid is effected through a turning joint located in the axis of the drum or tray of the machine and supplying a distributor turning with this latter and comprising as many outlets as injection stations.

According to one particular embodiment of the invention, the fixed but turning pad is pulled by a spring which restores it into the normal gripping position.

In order that the invention may be more fully understood one embodiment thereof is described below purely by way of illustrative but non-limiting example and with reference to the accompanying schematic drawing in which:

FIGS. 1 and 2 are views respectively in front elevation and in plan from above, of the entirety of one embodiment of a machine according to the invention;

FIG. 5 is a partial view in plan from below, similar to FIG. 3, illustrating a special feature of this machine;

FIG. 6 is a cross-sectional view along the line 6—6 of FIG. 5; and

FIG. 7 is a cross-sectional view along the line 7—7 of FIG. 6.

Figure 1:
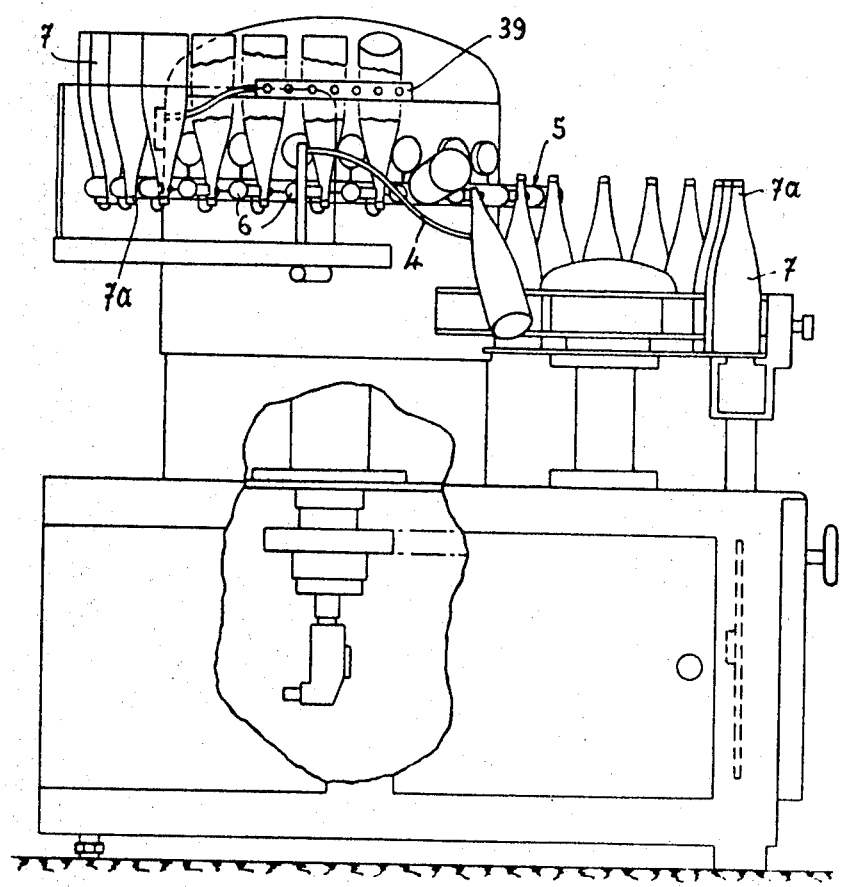

Referring now to the drawings, the present invention relates to machines of the type shown in FIGS. 1 and 2, i.e. for turning bottles by taking them one by one from the input side 2, and setting them down again on the output side 3, after having subjected them, by means of fixed ramps 4, to the desired number of turns. Means for gripping treated bottles are arranged radially on the periphery of a revolving drum or tray around which are placed the turning ramps.

Following the improvement according to the invention, each of the arms 6 arranged radially at the periphery of the tray 5 and constituting the gripping means for the bottles 7 bears, on its two opposite sides, one of two pads 8b and 9a of two neighboring pairs of pads 8 and 9.

Figure 3:
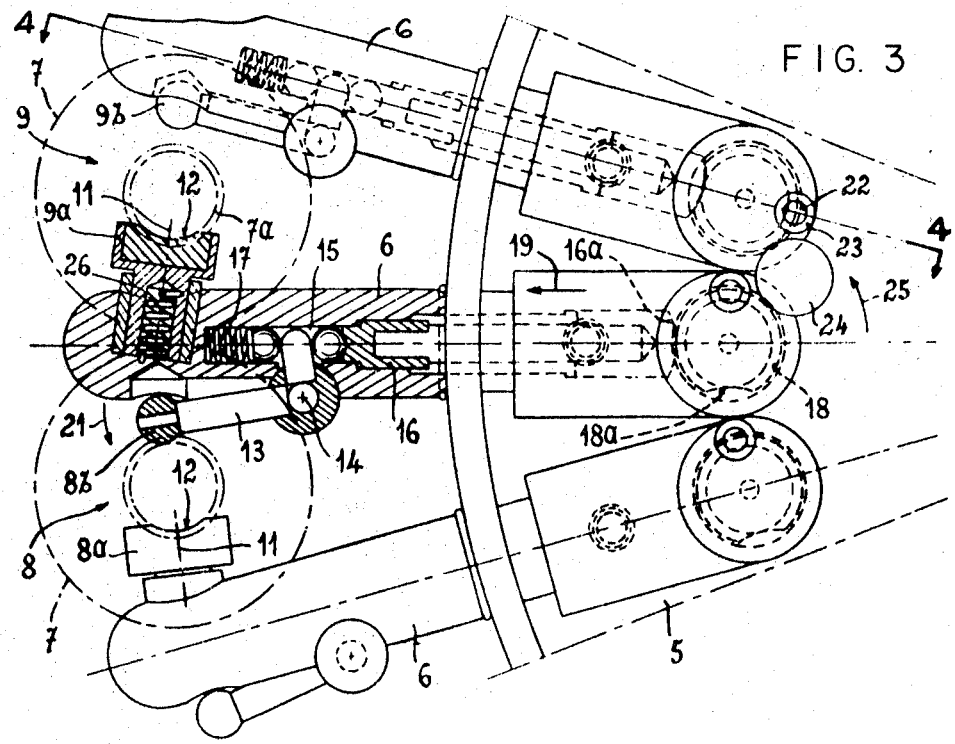
FIG. 3 is, on an enlarged scale, a partial view in plan from below showing the arrangement of the arms of the machine of FIGS. 1 and 2, of which one arm is seen in axial cross-section, along the line 3—3 of FIG. 4.
Figure 4:
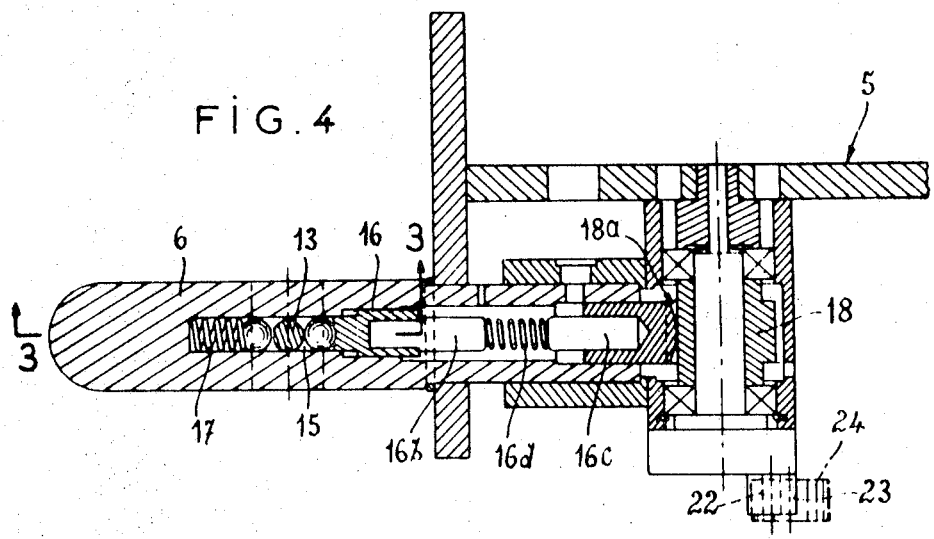
FIG. 4 is a view in cross-section along the line 4—4 of FIG. 3.

In the example illustrated in the drawing, especially in FIGS. 3 and 4, each pad 8a, 9a, etc., is mounted pivotably around a horizontal axis 11, so as to be able to accompany the bottle 7 on its turning and its front end has a cradle 12 of semi-cylindrical profile corresponding to the outer diameter of the neck 7a of the bottle 7.

The other pad 8b, 9b, etc. of each pair of pads 8, 9, etc. is constituted by a ball borne by a finger 13 bent at right angles, hinged around a vertical axis 14 borne by the arm 6 under consideration. The opposite end of each finger 13 to the pad 8b or 9b projects radially inside a cylindrical housing 15 arranged in the axis of each arm 6. In each housing 15 is axially movable a push member 16 normally held by a spring 17 with its end-piece 16a bearing against a cam 18 at the periphery of which is fashioned an indent 18a. When the end-piece 16a of a push member 16 can penetrate into the indent 18a of the cam 18 (arm 6 from above of FIG. 3), the corresponding pad 9b is in retracted position, whereas when the end-piece 16a of the push member 16 is outside the indent 18a, as a result of its displacement in the direction of the arrow 19 and of the rocking which results in the direction of the arrow 21 of the angled finger 13, the corresponding pad 8b is displaced in the direction of the pad 8a which is associated with it, so as to lock between them both the neck 7a of a bottle 7.

The position of the movable push rod 8b, 9b, etc. hence depends on the angular position of the cam 18.

This cam bears, on its lower face, a vertical axle 22 on which is mounted a roller 23, and the frame of this machine bears a fixed stop 24, situated in the input zone 2 of the bottles 7, at the level of the rollers 23 of cams 18.

When, in the course of the rotation of the tray 5, the arms 6 arrive in the bottle input zone 2, the rollers 23 and the diametrically opposite indents 18a of cams 18 are situated in the axis of arms 6, each end-piece 16a of the push rods 16 being then supported against the corresponding indent 18a.

After the neck 7a of a bottle 7 has been presented between a pair of pads 8a and 8b, or 9a and 9b the roller 23 of the corresponding cam 18 coming into contact with the fixed stop 24 causes pivoting through a quarter of a turn of the said cam 18 in the direction of the arrow 25.

In the exit zone 3 of the bottles 7, a second fixed stop, not shown in the drawing, and playing the reverse role of the stop 24 causes the return to their starting position of the cams 18, and consequently, of the movable push rods 8b, 9b, etc., so as to release the treated bottles.

As is seen, this arrangement has the advantage of requiring the presence of only a single arm 6 per pair of pads. Moreover, since the bottles 7 are seized by their necks 7a, the angular separation necessary between two adjacent arms 6 is small and during their treatment the bottles 7 may be edge to edge.

Another advantage resides in the fact that when they are brought into gripping position, the bent fingers 13 are locked in irreversible manner.

However, to avoid any risk of too severe gripping of the necks 7a of the bottles 7 of which the sides are not always very regular, each push member may be constituted by two coaxial elements 16b and 16c, with the interposition of a helical compensating spring 16d.

In order that the fixed but turning pads 8a, 9a, etc. may be always in the appropriate position for gripping the bottle 7 when they arrive in the input zone 2 of the machine, there are provided return springs 26, operating in torsion and restoring the pads 8a, 9a etc. automatically into their normal position for taking a bottle, such as illustrated in FIG. 3.

Another feature of the invention consists in advantageously utilizing the support of each turn pad 8a, 9a, etc. to adjust a nozzle 27, which coming automatically into position opposite the opening of the neck 7a of the bottle 7 gripped by the said pad, enables injection into the inside of this latter of any desired fluid for washing, sterlizing, rinsing and even filling.

As is seen in FIG. 5, the nozzle 27 is borne radially by the corresponding pad 8a and communicates with a channel 28 coaxially arranged in the cylindrical body of pad 8a. This cylindrical body constitutes a turncock in combination with the corresponding arm 6. Indeed, inside each arm 6 is arranged a channel 29 for the supply of fluid, opening radially into the bearing surface 31 of the cylindrical body of the corresponding fixed turn pad 8a, 9a, etc.

The angular opening position of this turncock is naturally determined as a function of the requirements of use, and this position is obviously adopted several times, if the bottle 7 is subjected to several turns.

As is shown in FIGS. 6 and 7, one cock 32 controlled by a cam, is advantageously associated with the turncock incorporated at each fixed turn pad 8a, 9a, etc.

In the body of this cock 32 are arranged a channel 33 for the supply of fluid and a fluid outlet channel 34 communicating with the channel 29 of the corresponding arm 6.

The channels 33 and 34 communicate between themselves through an intermediate channel 35 inside which is located a valve 36 normally held in closed position, by a spring 37. An oscillating lever 38 borne by the body of the cock 32 has one of its ends 38a situated inside the cock 32 in contact with the valve rod 36 while its other end 38b, situated outside the cock 32, is intended to be actuated by one or several fixed cams, in the course of the rotation of the revolving tray 5.

Through one or several cams it is therefore possible to control in entirely automatic fashion the opening of the valve 36 as many times as desired, during each revolution of the revolving tray 5.

Finally, as is shown in FIGS. 1 and 6, the supply of each cock 32, and consequently, of each nozzle 27, may be controlled by a distributor 39 borne by the revolving plate 5, itself supplied through a rotating connection located in the axis of rotation of the said tray and comprising as many outlets as the machine contains nozzles 27.

As goes without saying, the invention is not limited to the single embodiment of this machine which has been described above by way of non-limiting example; various changes and modifications may be made, on the contrary, without departing from the essential concept of the invention as defined in scope by the appended claims.

I claim:

1. A machine for turning bottles during their transport on an advancing conveyor, the bottles having necks of reduced diameter said machine comprising means for turning the bottles in a plane perpendicular to the path of travel thereof on said conveyor, arms secured to the conveyor and each located between two adjacent bottles, each arm having opposite surfaces and including a first and second pad each on a respective opposite surface, the first pad of one arm facing the second pad of an adjacent arm, and means acting on said pads to cause the same to grip the neck of a bottle placed between the arms while permitting turning of the bottle, the latter means including spring means acting on said first pad to urge the same against the neck of a bottle, said first pad being mounted on its respective arm for free turnable movement about a horizontal axis, and means connecting the second pad from the associated arm for pivotable movement about a vertical axis to engage the neck of a bottle and hold the same against the first pad of an adjacent arm while the bottle is turning and the first pad follows the turning movement of the bottle.

2. A machine according to claim 1, comprising actuating means for each said second pad comprising a cam driven in rotation during travel of the conveyor and a push member actuated by said cam and acting on said second pad to pivot the same.

3. A machine according to claim 2, wherein said push member is constituted by at least two coaxial elements and a compensating spring interposed therebetween.

4. A machine according to claim 1, comprising a nozzle attached to said first pad and located opposite the opening of the bottle neck, and supply means connected to the nozzle for the supply of a fluid for injection into the bottles.

5. A machine according to claim 4, wherein said first pad includes a cylindrical shaft, a bushing in said arm rotatably supporting the shaft, said bushing defining channels and said shaft being arranged to constitute a turncock for the supply of fluid from a supply channel arranged in its respective arm, the opening and closing of the turncock being synchronized with predetermined angular positions of the bottle held in said first pad.

6. A machine according to claim 4, including at least one additional driven cam, and a valve cock controlling the supply of fluid to the nozzle, said additional cam being arranged to govern the opening and closing of each said valve cock.

7. A machine according to claim 6, wherein said conveyor comprises a drum, a turning joint arranged in said drum, a distributor coacting with said joint and having as many outlets as there are arms to effect the distribution of the fluid to said nozzles.

8. A machine according to claim 3, comprising a return spring arranged to act in torsion on said first pad so as to restore it into normal position for gripping the neck of a bottle.

9. A machine according to claim 8, comprising a nozzle attached to said first pad so as to be automatically located opposite the opening of the bottle neck, and supply means connected to the nozzle for the supply of fluid for injection into the bottles.

10. A machine according to claim 1, wherein said first pad has a concave face serving as a cradle for the neck of a bottle.

11. A machine according to claim 10, wherein said second pad is of ball shape.

12. A machine according to claim 1, comprising a return spring acting in torsion on said first pad so as to restore it to normal position for gripping the neck of a bottle.

References Cited

UNITED STATES PATENTS

| | | | |
|---|---|---|---|
| 1,958,846 | 5/1934 | Christensen | 214—313 X |
| 3,208,579 | 9/1965 | Perrier et al. | 198—33 |

EVON C. BLUNK, Primary Examiner

A. N. GOODMAN, Assistant Examiner

U.S. Cl. X.R.

134—52, 68, 152; 198—22, 25, 33 AD